(12) United States Patent
Surcouf et al.

(10) Patent No.: US 10,545,914 B2
(45) Date of Patent: Jan. 28, 2020

(54) DISTRIBUTED OBJECT STORAGE

(71) Applicant: Cisco Technology, Inc., San Jose, CA (US)

(72) Inventors: Andre Surcouf, St Leu la Foret (FR); Guillaume Ruty, Paris (FR); William Mark Townsley, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 343 days.

(21) Appl. No.: 15/408,129

(22) Filed: Jan. 17, 2017

(65) Prior Publication Data

US 2018/0203866 A1  Jul. 19, 2018

(51) Int. Cl.
| | | |
|---|---|---|
| G06F 16/11 | (2019.01) | |
| G06F 16/13 | (2019.01) | |
| G06F 16/16 | (2019.01) | |
| H04L 29/08 | (2006.01) | |

(52) U.S. Cl.
CPC ............ *G06F 16/122* (2019.01); *G06F 16/13* (2019.01); *G06F 16/164* (2019.01); *H04L 67/1097* (2013.01)

(58) Field of Classification Search
CPC ...... G06F 16/122; G06F 16/164; G06F 16/13; H04L 67/1097
See application file for complete search history.

(56) References Cited

U.S. PATENT DOCUMENTS

| | | |
|---|---|---|
| 4,688,695 A | 8/1987 | Hirohata |
| 5,263,003 A | 11/1993 | Cowles et al. |
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |

(Continued)

FOREIGN PATENT DOCUMENTS

| | | |
|---|---|---|
| EP | 2228719 | 9/2010 |
| EP | 2439637 | 4/2012 |

(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.

(Continued)

*Primary Examiner* — Jorge A Casanova
(74) *Attorney, Agent, or Firm* — Polsinelli PC

(57) ABSTRACT

The disclosure provides a system, method and computer-readable storage device embodiments. Some embodiments can include an IPv6-centric distributed storage system. An example method includes receiving, at a computing device, a request to create metadata associated with an object from a client, creating the metadata based on the request and transmitting the metadata and an acknowledgment to the client, wherein the metadata contains an address in a storage system for each replica of the object and wherein the metadata can be used to write data to the storage system and read the data from the storage system. There is no file system layer between an application layer and a storage system layer.

18 Claims, 10 Drawing Sheets

(56) References Cited

U.S. PATENT DOCUMENTS

| | | |
|---|---|---|
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni, Sr. et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |

(56) References Cited

U.S. PATENT DOCUMENTS

| | | |
|---|---|---|
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,727,588 B1 * | 8/2017 | Ostapovicz ............... G06F 3/06 |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |

(56) References Cited

U.S. PATENT DOCUMENTS

| | | |
|---|---|---|
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subramanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0178996 A1* | 7/2011 | Pendlebury ......... G06F 11/1453 707/692 |
| 2011/0228679 A1 | 9/2011 | Varma et al. |
| 2011/0231899 A1 | 9/2011 | Puller et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013570 A1* | 1/2013 | Yamakawa ......... G06F 3/0608 707/679 |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |

(56) References Cited

U.S. PATENT DOCUMENTS

| | | |
|---|---|---|
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0321338 A1* | 11/2016 | Isherwood .......... H04L 67/1095 |
| 2016/0334998 A1 | 11/2016 | George et al. |
| 2016/0366094 A1* | 12/2016 | Mason ................ H04L 61/2038 |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

Author Unknown, "delphi—Save a CRC value in a file, without altering the actual CRC Checksum?" Stack Overflow, stackoverflow. com, Dec. 23, 2011, XP055130879, 3 pages http://stackoverflow.com/questions/8608219/save-a-crc-value-in-a-file-without-altering-the-actual-crc-checksum.

Author Unknown, "EMC UNISPHERE: Innovative Approach to Managing Low-End and Midrange Storage; Redefining Simplicity in the Entry-Level and Midrange Storage Markets," Data Sheet,

(56) References Cited

OTHER PUBLICATIONS

EMC Corporation; published on or about Jan. 4, 2013 [Retrieved and printed Sep. 12, 2013] 6 pages http://www.emc.com/storage/vnx/unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Network Transformation with Software-Defined Networking and Ethernet Fabrics," Positioning Paper, 2012, 6 pages, Brocade Communications Systems.

Author Unknown, "Recreating Real Application Traffic in Junosphere Lab," Solution Brief, Juniper Networks, Dec. 2011, 3 pages.

Author Unknown, "Shunra for HP Softwarer," Enabling Confidence in Application Performance Before Deployment, 2010, 2 pages.

Author Unknown, "Software Defined Networking: The New Norm for Networks," White Paper, Open Networking Foundation, Apr. 13, 2012, 12 pages.

Author Unknown, "Software Defined Storage Networks an Introduction," White Paper, Doc # 01-000030-001 Rev. A, Dec. 12, 2012, 8 pages; Jeda Networks, Newport Beach, California, U.S.A.

Author Unknown, "Standard RAID Levels," Wikipedia, the Free Encyclopedia, last updated Jul. 18, 2014, 7 pages; http://en.wikipedia.org/wiki/Standard_RAID_levels.

Author Unknown, "Storage Infrastructure for the Cloud," Solution Brief, © 2012, 3 pages; coraid, Redwood City, California, U.S.A.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.

Author Unknown, "The Fundamentals of Software-Defined Storage, Simplicity at Scale for Cloud-Architectures" Solution Brief, 2013, 3 pages; Coraid, Redwood City, California, U.S.A.

Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.

Author Unknown, "Xgig Analyzer: Quick Start Feature Guide 4.0," Feb. 2008, 24 pages, Finisar Corporation, Sunnyvale, California, U.S.A.

Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.

Author Unknown, "Vblock Solution for SAP: Simplified Provisioning for Operation Efficiency," VCE White Paper, VCE—The Virtual Computing Environment Company, Aug. 2011, 11 pages.

Berman, Stuart, et al., "Start-Up Jeda Networks in Software Defined Storage Network Technology," Press Release, Feb. 25, 2013, 2 pages, http://www.storagenewsletter.com/news/startups/jeda-networks.

Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.

Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.

Cisco Systems, Inc. "N-Port Virtualization in the Data Center," Cisco White Paper, Cisco Systems, Inc., Mar. 2008, 7 pages.

Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.

Cisco Systems, Inc., "Cisco Prime Data Center Network Manager 6.1," At-A-Glance, © 2012, 3 pages.

Cisco Systems, Inc., "Cisco Prime Data Center Network Manager," Release 6.1 Data Sheet, © 2012, 10 pages.

Cisco Systems, Inc., "Cisco Unified Network Services: Overcome Obstacles to Cloud-Ready Deployments," White Paper, Cisco Systems, Inc., Jan. 2011, 6 pages.

Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.

Cummings, Roger, et al., Fibre Channel—Fabric Generic Requirements (FC-FG), Dec. 4, 1996, 33 pages, American National Standards Institute, Inc., New York, New York, U.S.A.

Farber, Franz, et al. "An In-Memory Database System for Multi-Tenant Applications," Proceedings of 14th Business, Technology and Web (BTW) Conference on Database Systems for Business, Technology, and Web, Feb. 28-Mar. 4, 2011, 17 pages, University of Kaiserslautern, Germany.

Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.

Hatzieleftheriou, Andromachi, et al., "Host-side Filesystem Journaling for Durable Shared Storage," $13^{th}$ USENIX Conference on File and Storage Technologies (FAST '15), Feb. 16-19, 2015, 9 pages; http://www.usenix.org/system/files/conference/fast15/fast15-paper-hatzieleftheriou.pdf.

Hedayat, K., et al., "A Two-Way Active Measurement Protocol (TWAMP)," Network Working Group, RFC 5357, Oct. 2008, 26 pages.

Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].

Hosterman, Cody, et al., "Using EMC Symmetrix Storage in VMware vSph ere Environments," Version 8.0, $EMC^2$Techbooks, EMC Corporation; published on or about Jul. 8, 2008, 314 pages; [Retrieved and printed Sep. 12, 2013].

Hu, Yuchong, et al., "Cooperative Recovery of Distributed Storage Systems from Multiple Losses with Network Coding," University of Science & Technology of China, Feb. 2010, 9 pages.

Keogh, Eamonn, et al., "Dimensionality Reduction for Fast Similarity Search in Large Time Series Databases," KAIS Long Paper submitted May 16, 2000; 19 pages.

Kolyshkin, Kirill, "Virtualization in Linux," Sep. 1, 2006, pp. 1-5.

Kovar, Joseph F., "Startup Jeda Networks Takes SDN Approach to Storage Networks," CRN Press Release, Feb. 22, 2013, 1 page, http://www.crn.com/240149244/printablearticle.htm.

Lampson, Butler, W., et al., "Crash Recovery in a Distributed Data Storage System," Jun. 1, 1979, 28 pages.

Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.

Lin, Jessica, "Finding Motifs in Time Series," SIGKDD'02 Jul. 23,-26, 2002, 11 pages, Edmonton, Alberta, Canada.

Linthicum, David, "VM Import could be a game changer for hybrid clouds", InfoWorld, Dec. 23, 2010, 4 pages.

Long, Abraham Jr., "Modeling the Reliability of RAID Sets," Dell Power Solutions, May 2008, 4 pages.

Ma, Ao, et al., "RAIDShield: Characterizing, Monitoring, and Proactively Protecting Against Disk Failures," FAST '15, $13^{th}$ USENIX Conference on File and Storage Technologies, Feb. 16-19, 2015, 17 pages, Santa Clara, California, U.S.A.

Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hip.at/doc/rfc/rfc7348.html.

(56) References Cited

OTHER PUBLICATIONS

McQuerry, Steve, "Cisco UCS M-Series Modular Servers for Cloud-Scale Workloads," White Paper, Cisco Systems, Inc., Sep. 2014, 11 pages.

Monia, Charles, et al., IFCP—A Protocol for Internet Fibre Channel Networking, draft-monia-ips-ifcp-00.txt, Dec. 12, 2000, 6 pages.

Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.

Muglia, Bob, "Decoding SDN," Jan. 14, 2013, Juniper Networks, pp. 1-7, http://forums.juniper.net/15/The-New-Network/Decoding-SDN/ba-p/174651.

Murray, Joseph F., et al., "Machine Learning Methods for Predicting Failures in Hard Drives: A Multiple-Instance Application," Journal of Machine Learning Research 6 (2005), pp. 783-816; May 2005, 34 pages.

Nelson, Mark, "File Verification Using CRC," Dr. Dobb's Journal, May 1, 1992, pp. 1-18, XP055130883.

Pace, Alberto, "Technologies for Large Data Management in Scientific Computing," International Journal of Modern Physics C., vol. 25, No. 2, Feb. 2014, 72 pages.

Pinheiro, Eduardo, et al., "Failure Trends in a Large Disk Drive Population," Fast '07, 5th USENIX Conference on File and Storage Technologies, Feb. 13-16, 2007, 13 pages, San Jose, California, U.S.A.

Raginsky, Maxim, et al., "Sequential Anomaly Detection in the Presence of Noise and Limited Feedback," arXiv:0911.2904v4 [cs.LG] Mar. 13, 2012, 19 pages.

Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.

Sajassi, A., et al., "BGP MPLS Based Ethernet VPN," Network Working Group, Oct. 18, 2014, 52 pages.

Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.

Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.

Schroeder, Bianca, et al., "Disk failures in the real world: What does an MTTF of 1,000,000 hours mean to you?" FAST '07: 5th USENIX Conference on File and Storage Technologies, Feb. 13-16, 2007, 16 pages, San Jose, California, U.S.A.

Shue, David, et al., "Performance Isolation and Fairness for Multi-Tenant Cloud Storage," USENIX Association, 10th USENIX Symposium on Operating Systems Design Implementation (OSDI '12), 2012, 14 pages; https://www.usenix.org/system/files/conference/osdi12/osdi12-final-215.pdf.

Staimer, Marc, "Inside Cisco Systems' Unified Computing System," Dragon Slayer Consulting, Jul. 2009, 5 pages.

Swami, Vijay, "Simplifying SAN Management for VMWare Boot from SAN, Utilizing Cisco UCS and Palo," posted May 31, 2011, 6 pages.

Tate, Jon, et al., "Introduction to Storage Area Networks and System Networking," Dec. 2017, 302 pages, ibm.com/redbooks.

Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.

Wang, Feng, et al. "OBFS: A File System for Object-Based Storage Devices," Storage System Research Center, MSST. vol. 4., Apr. 2004, 18 pages.

Weil, Sage A., "CEPH: Reliable, Scalable, and High-Performance Distributed Storage," Dec. 2007, 239 pages, University of California, Santa Cruz.

Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.

Weil, Sage A., et al. "Ceph: A Scalable, High-performance Distributed File System," Proceedings of the 7th symposium on Operating systems design and implementation. USENIX Association, Nov. 6, 2006, 14 pages.

Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.

Xue, Chendi, et al. "A Standard framework for Ceph performance profiling with latency breakdown," CEPH, Jun. 30, 2015, 3 pages.

Zhou, Zihan, et al., "Stable Principal Component Pursuit," arXiv:1001.2363v1 [cs.IT], Jan. 14, 2010, 5 pages.

Zhu, Yunfeng, et al., "A Cost-based Heterogeneous Recovery Scheme for Distributed Storage Systems with RAID-6 Codes," University of Science & Technology of China, 2012, 12 pages.

Extended European Search Report dated Jun. 8, 2018, 6 pages, from the European Patent Office for corresponding EP Application No. 18150944.9.

Stamey, John, et al., "Client-Side Dynamic Metadata in Web 2.0," SIGDOC '07, Oct. 22-24, 2007, pp. 155-161.

Aweya, James, et al., "Multi-level active queue management with dynamic thresholds," Elsevier, Computer Communications 25 (2002) pp. 756-771.

Petersen, Chris, "Introducing Lightning: A flexible NVMe JBOF," Mar. 9, 2016, 6 pages.

* cited by examiner

DISTRIBUTED OBJECT STORAGE

TECHNICAL FIELD

The present disclosure relates storage of data and more particularly to a distributed storage system that utilizes a pool of metadata servers and a pool of storage nodes which utilizes unique addresses for content, such as IPv6 (or similar) addresses.

BACKGROUND

A lot of different distributed storage systems exist, such as the Google file system, Ceph, Hadoop, Amazon EC2 are a few of the most common storage systems. Ceph is an object storage system that optionally provides a traditional file system interface with POSIX semantics. Object storage systems complement but do not replace traditional file systems. One can run one storage cluster for object, block and file-based data storage. Ceph's file system runs on top of the same object storage system that provides object storage and block device interfaces. The Ceph metadata server cluster provides a service that maps the directories and file names of the file system to objects stored within RADOS (Reliable Autonomic Distributed Object Store) clusters. The metadata server cluster can expand or contract, and it can rebalance the data dynamically to distribute data evenly among cluster hosts. This ensures high performance and prevents heavy loads on specific hosts within the cluster.

Storage systems with typical architectures have a number of issues that reduce their efficiency. These issues include many layers of software through which communication must pass to write and read data. The heavy layering increases the complexity of the system which can require detailed configuration and optimization efforts. The current architectures also are difficult to scale given the layering and complexity issues. Furthermore, all these architectures are constructed on the fundamental assumption the disks are the performance bottleneck. Much software engineering has been spent to find solutions (e.g. File System caches) to mask poor disk performances. New solid-state device (SSD) technologies are likely to make deciduous this foundational assumption. As a consequence, a whole industry could literally fall apart and be replaced by new approaches in which the storage devices are not any more considered as the performance bottleneck. These and other issues suggest a need in the art for improved processes for managing data storage.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
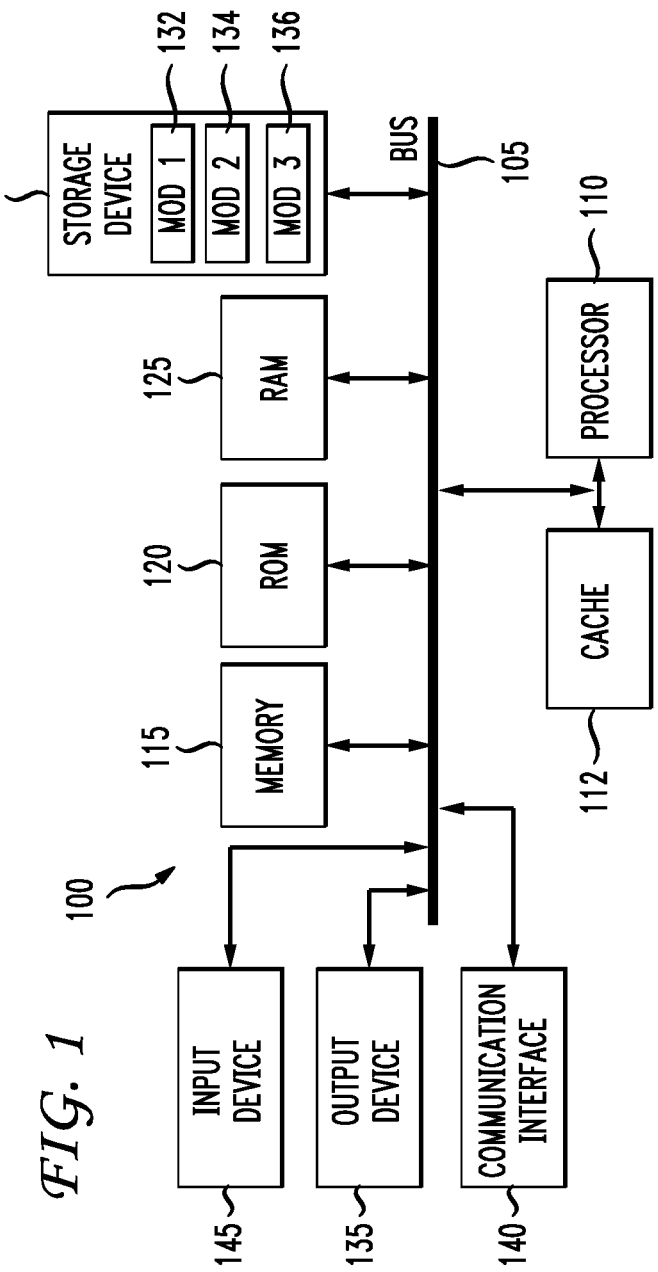
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure addresses the issues raised above with respect to storing and managing large flow tables on switches. The disclosure aims at solving the problems by collapsing layers and averaging new (IPv6, for example) functionalities such as segment routing. The proposed solution also addresses the CPU/Network potential bottleneck consequence of forthcoming super high performance storage devices.

The disclosure provides a system, method and computer-readable storage device embodiments. An example method includes receiving, at a computing device, a request to create metadata associated with an object from a client, creating the metadata based on the request and transmitting the metadata and an acknowledgment to the client, wherein the metadata contains an address in a storage system for each replica of the object and wherein the metadata can be used to write data to the storage system and read the data from the storage system.

An aspect of this disclosure is that there is no filesystem layer between the application layer and the storage system. In another aspect, the file system can become the application as described herein. The storage system contains the pool of metadata servers and the pool of stored servers. Writing and reading the data from the storage system can be accomplished via an IPv6 address stored in or associated with the metadata. The IPv6 address can identify and/or locate the data. In one example, the IPv6 prefix can be used to represent a group of addresses and/or subnets. Moreover, the IPv6 prefix can represent specific nodes and/or classes of data, objects, storage, etc. Classes can be based on one or more factors such as quality of service (QoS) requirements, priorities, policies, size, partitioning, a similarity, a state, a property, usage characteristics, a preference, a parameter, a data type, storage characteristics, etc. For example, an IPv6 prefix can represent, without limitation, a specific node, a specific type of storage, or a specific type of data.

A metadata prefix can represent a metadata server, a storage node, metadata classes, etc. Metadata replicas have distinct IPV6 addresses and in one aspect would not be identified by a prefix. In some cases, a metadata prefix is assigned to each tenant in a multi-tenant environment. This can enable isolation, improve security, facilitate management, prevent collisions, etc. The client can compute a family of pseudorandom seeded hashes based on at least one of an object name and consecutive integers as seeds. The client can compute a family of pseudorandom seeded X-bit hashes based on an object name. X can be less than or equal to 128. The value can depend on the length of the metadata IPv6 prefix assigned to a storage domain. The organization of metadata servers is unknown to the client and can be dynamic if metadata servers are added or removed. Only the global metadata IPv6 prefix is static. The metadata can include, without limitation, the address for metadata replicas, the address of object replicas, state information associated with the object replicas, object name, object characteristics (e.g., size, properties, etc.), storage node or system information (e.g., access control lists, policies, configuration data, etc.), and so forth. Thus, for example, the metadata, when used to write the data to the storage system, can be utilized to write replica data to the storage system.

The method can further include, by the computing device, determining where to store the data on the storage system based on one or more of a placement policy, system-wide metrics, client recommendations, and quality of service requirements. As previously noted, an IPv6 address can be used to identify the data and/or location of the data, and the prefix associated with the IPv6 address can identify or represent the storage node, storage segment, data class, etc.

Description

The present disclosure addresses the issues raised above. For example, the architecture disclosed herein is flexible, scalable, and not heavily layered as prior approaches. Accordingly, the imposition of the amount of complexity with so many layers can be reduced into a more simplified system. This can reduce the number of disk I/O's, bottlenecks, use of mass storage, and multiple layers. The approach disclosed herein also improves the ability to expand the scaling of the storage system. The present disclosure addresses these problems and other problems by collapsing layers and leveraging IPv6 functionality such as, but not limited to, segment routing.

Figure 2:
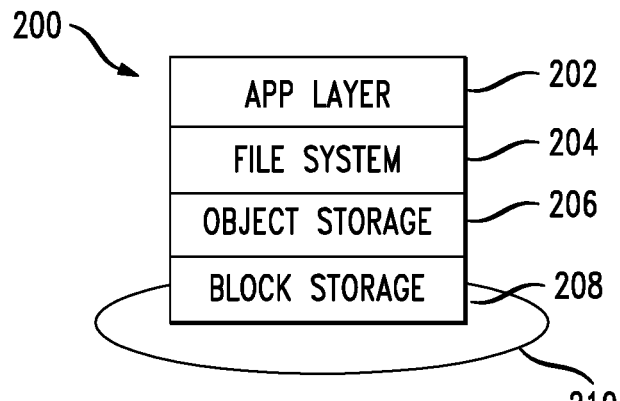
FIG. 2 illustrates a layering of software for managing object storage.
Figure 3:
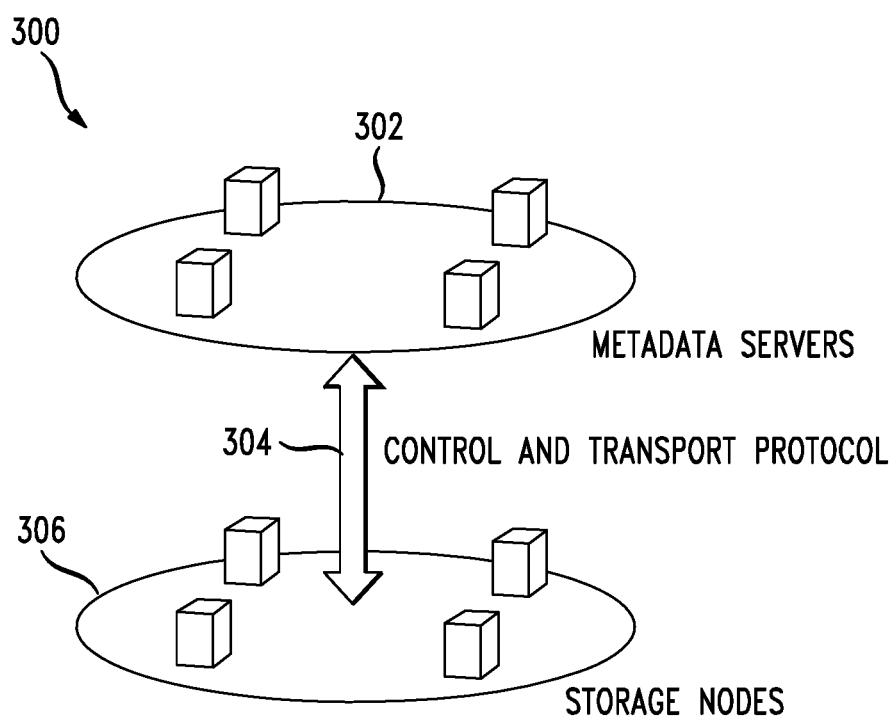
FIG. 3 illustrates an approach of the communication of metadata servers and storage nodes.

The disclosure first discusses in more detail some of the issues with standard storage system. Storage systems generally fall under a particular type of architecture 200 shown in FIG. 2. The application layer 202 runs on top of the storage system. The file system layer 204, while often part of the storage system, is not mandatory if the applications are designed to work directly with an object storage 206. There also can be distributed file systems that run directly on a block storage 208 such as the Google File System (GFS). The object storage and/or block storage 210 are considered the heart of the overall storage system. The structures vary a lot between the different distribution storage systems. FIG. 3 illustrates the general architecture 300 for these various layers.

The system 300 stores metadata about the stored objects, files, and/or the whole system on metadata servers 302. Depending on which system, there can be multiple metadata servers (As in the Hadoop Distributed File System or HDFS) or just one (GFS). In these systems, a protocol 304 is designed for the client applications to communicate with the metadata servers 302. The data is ultimately stored in storage nodes 306. The protocol 302 is often based on HTTP. A pool of storage nodes contains the actual data. These nodes 306 are often organized in a structure: a ring, a tree, or any other structure. The protocol 302 is then used for the clients and the metadata nodes 302 to interact with the storage nodes to write or retrieve data, replicate contents at the file system level, load balance or any other features of the system.

Figure 4:
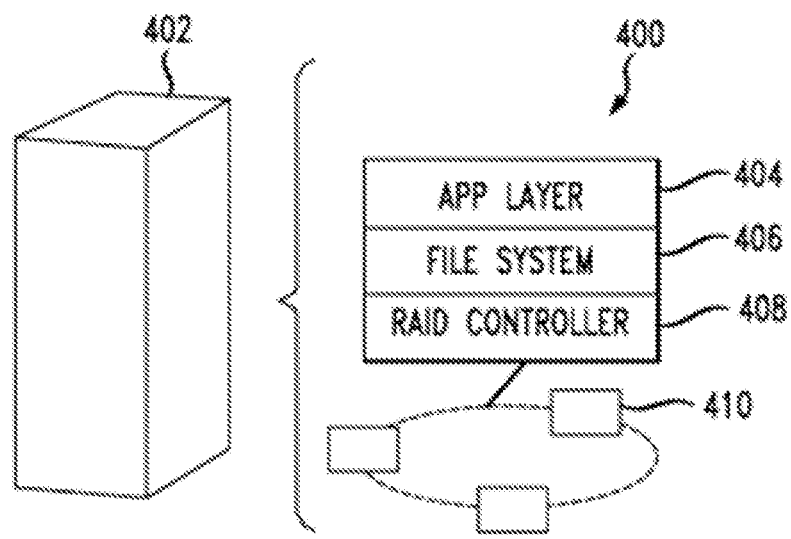
FIG. 4 illustrates a layered structure and raid storage devices and a server.

FIG. 4 illustrates a storage node structure 400. The storage nodes 402 includes an application layer 404 that is in charge of receiving requests and handling them based on the protocol mentioned above. The application layer 404 usually sits on top of the local file system 406 having partitions that contain stored contents. For local replication, a redundant array of independent disks (RAID) controller 408 can be used to ensure the data is not lost on the storage node. Note that this level of replication is independent from the system level replication. This can lead to redundancies and cost inefficiencies, because this can effectively lead to a high effective replication factor, which in turn means a much lower ratio of effective data stored in the total system storage capacity.

As noted above, there are a number of issues with standard architectures. For example, the software is heavily layered. A client fetching data must communicate through a large number of software layers, which can be as many as seven or eight layers. These layers are not always designed to interoperate in an optimal way. This translates in reading and writing throughput that are often not optimal. Next, the heavy layering also imposes a fair amount of complexity on the operators. Each of these layers requires complex configuration, optimization, parameterization, and so forth. Furthermore, in these kinds of systems, based on the assumption that the disc inputs and outputs (I/Os) are the effective bottleneck of most storage systems, multiple layers are added on top of one another. This means that different software layers are partly designed to reduce the number of I/O's at the cost of more RAM and/or CPU usage. With upcoming large improvements in disk and flash technologies, this is not going to be the case anymore. Storage I/O's are bound to be a lot faster in a few years, shifting the bottleneck from storage I/O's to network bandwidth and even the CPU. Thus, additional software layers that consume CPU cycles are going to become a hindrance more than a help in storage systems.

Most of these systems have limited scaling capacity. The GFS has built itself around a single-master approach. This means the every client interaction with the system has to go at least once through a single master (replicated for failover but not for load balancing) that contains the useful metadata. Even with lightweight metadata, limited interactions and client caching, the approach scales only to a point as the number of clients grow. Ceph has chosen not to have metadata servers (this is not completely true: metadata servers will need to keep track of the cluster map but this is not usually the main bottleneck of Ceph-based systems).

Instead, it places data deterministically by hashing the object name and finding a storage node target according to the hash. While this effectively removes the master bottleneck of GFS, this implies that when a storage nodes is added or removed (voluntarily or upon failure), a non negligible quantity of data has to be moved on the new target node of its deterministic hash. Analytically, the order of magnitude of data that has to be moved is around the capacity of the device added or removed. While this works for small clusters where devices are not often added or removed, this does not easily scale for bigger clusters having numerous big storage nodes.

Furthermore, the capacity of storage devices increases much faster than bandwidth capacity. That is to say, in a few years from now, the network capacity won't be able to sustain adding or removing a petabyte storage node.

The protocols used for intra and inter layers (between metadata servers, storage nodes and clients) create additional overhead for every communication. This overhead is naturally augmented by the complexity of the system. This is because the more layers there are, the more difficult it is to optimize their interactions and deal with exceptional or rare cases without decreasing the overall efficiency.

The disclosure next turns to FIG. 1 which generally describes a computer system, such as a computer client or server.

FIG. 1 illustrates a computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output.

There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

This disclosure now turns to a more detailed description of the various concepts and examples herein. Among other things, this disclosure proposes a distributed and flexible storage system with a minimal number of layers. Thus, an example architecture can include the removal of the file system 204 shown in FIG. 2 such that the proposed architecture could simply include the application layer 202, an object storage layer 206 in a block storage layer 208. The application layer 202 can represent any application running on top of the storage system 206/208 (210). The system 210 contains a pool of metadata servers and a pool of storage servers.

There are several concepts that apply to the present disclosure. A first concept is that any kind of entity (for example, an object, metadata, a video, a file, and so forth) in the system can be identified and represented by a set of IP addresses, such as an IPv6 address. For example, the IPv6 protocol can provide prefixes which can be used to represent a "group" of such IPv6 addresses. The set of IP addresses can take into account the metadata replicas and the object replicas IPv6 addresses. In one aspect it could be said that the primary metadata replica IPv6 address (the first obtained via hashing) suffices to identify the object.

As the structure contemplated for metadata disclosed herein is an IPv6 address in one aspect, this disclosure shall briefly discuss the structure of an IPv6 address. While IPv6 is not required, and other structures are contemplated, IPv6 is discussed as one embodiment. IPv6 addresses have 128 bits, although for this disclosure, the addresses may have less than 128 significant bits. The design of the IPv6 address space implements a different design philosophy than in IPv4, in which subnetting was used to improve the efficiency of utilization of the small address space. In IPv6, the address space is deemed large enough for the foreseeable future, and a local area subnet most of the time uses 64 bits for the host portion of the address, designated as the interface identifier, while the most-significant remaining bits are used as the routing prefix.

The identifier is only unique within the subnet to which a host is connected. IPv6 has a mechanism for automatic address detection, so that address auto-configuration always produces unique assignments. The 128 bits of an IPv6 address are represented in 8 groups of 16 bits each. Each group is written as four hexadecimal digits and the groups are separated by colons (:). An example of this representation is 2001:0db8:0000:0000:0000:ff00:0042:8329.

An IPv6 packet has two parts: a header and payload. The header consists of a fixed portion with minimal functionality required for all packets and may be followed by optional extensions to implement special features. The fixed header occupies the first 40 bytes (320 bits) of the IPv6 packet. It contains the source and destination addresses, traffic classification options, a hop counter, and the type of the optional extension or payload which follows the header. This Next Header field tells the receiver how to interpret the data that follows the header. If the packet contains options, this field contains the option type of the next option. The "Next Header" field of the last option, points to the upper-layer protocol that is carried in the packet's payload.

Extension headers carry options that are used for special treatment of a packet in the network, e.g., for routing, fragmentation, and for security using the IPsec framework. Without special options, a payload must be less than 64 KB. With a Jumbo Payload option (in a Hop-By-Hop Options extension header), the payload must be less than 4 GB.

Unlike with IPv4, routers never fragment a packet. Hosts are expected to use path maximum transmission unit discovery (PMTUD) to make their packets small enough to reach the destination without needing to be fragmentation. PMTUD is a standardized technique for determining the maximum transmission unit size on the network path between two IPv6 hosts.

An IPv6 address can be abbreviated to shorter notations by application of the following rules. One or more leading zeroes from any groups of hexadecimal digits are removed; this is usually done to either all or none of the leading zeroes. For example, the group 0042 is converted to 42. Another rule is that consecutive sections of zeroes are replaced with a double colon (::). The double colon may only be used once in an address, as multiple use would render the address indeterminate. Some recommend that a double colon must not be used to denote an omitted single section of zeroes.

An example of application of these rules is as follows: Initial address: 2001:0db8:0000:0000:0000:ff00:0042:8329. After removing all leading zeroes in each group: 2001:db8:0:0:0:ff00:42:8329. After omitting consecutive sections of zeroes: 2001:db8::ff00:42:8329. The loopback address, 0000:0000:0000:0000:0000:0000:0000:0001, can be abbreviated to ::1 by using both rules.

Hosts verify the uniqueness of addresses assigned by sending a neighbor solicitation message asking for the Link Layer address of the IP address. If any other host is using that address, it responds. However, MAC addresses are designed to be unique on each network card which minimizes chances of duplication.

The pool of metadata servers that is organized in an architecture, which could be a binary tree but is not limited to such a binary tree. The metadata servers can contain metadata for the objects. They are in one example addressed by a range of IP addresses, each metadata server being assigned an IPv6 prefix (an example of which is defined above), i.e., not a single address. The aggregation of the prefixes of the metadata servers belonging to the same storage domain can be fixed and can be the metadata system IPv6 prefix. For example, if the metadata system prefix is 2001::0/64 and there are 2 metadata servers, they will respectively hold the prefixes 2001::0/65 and 2001::8000:0:0:0/65. If there are 4 metadata servers, they will respectively hold the prefixes 2001::0/66, 2001::4000:0:0:0/66, 2001::8000:0:0:0/66 and 2001::b000:0:0:0/66, hence the possible idea of binary tree.

The structure described herein enables the client to only need to know the metadata system prefix and doesn't apply to storage nodes, as only the metadata servers need to know in advance the storage nodes IPv6 prefixes. The pool of storage nodes can be organized in the same type of architecture. The storage nodes will contain the objects themselves. They are addressed by a range of IP addresses, each storage node being assigned an IPv6 prefix. A storage node is a logical storage device on top of which an application runs that is able to handle requests, assign a unique identifier (such as an IPv6 address or other protocol address) to stored object and retrieve the object according to the unique identifier. The system presented herein is fundamentally not a block storage system as that term is traditionally used for existing systems. It is a native object storage system that behaves as a block storage when the objects all have the same size. There is an advantage to this approach since the present disclosure can support several block storage systems having different block sizes as well as different object storage systems all of them at the same time and possibly sharing the same storage physical backend infrastructure, i.e., the storage nodes.

For example, a /110 prefix with fixed size objects of size 1 MB (for larger typical objects) could address up to approximately 4 TB of data. In another example, a /96 prefix with fixed sized objects of size 8 KB (a typical block size for a file system) could address up to approximately 32 TB of data. Thus, through the usage of different prefixes on the same storage system backend, different block storage systems with different block sizes could be built.

In one aspect, the identifier can be an IPv6 address which can identify the data, and its prefix can be assigned to the storage node itself. For backward compatibility with existing systems, a library, or any equivalent, will be provided to expose a classical object level interface thus keeping the underlying technical details hidden to the application.

Figure 5:
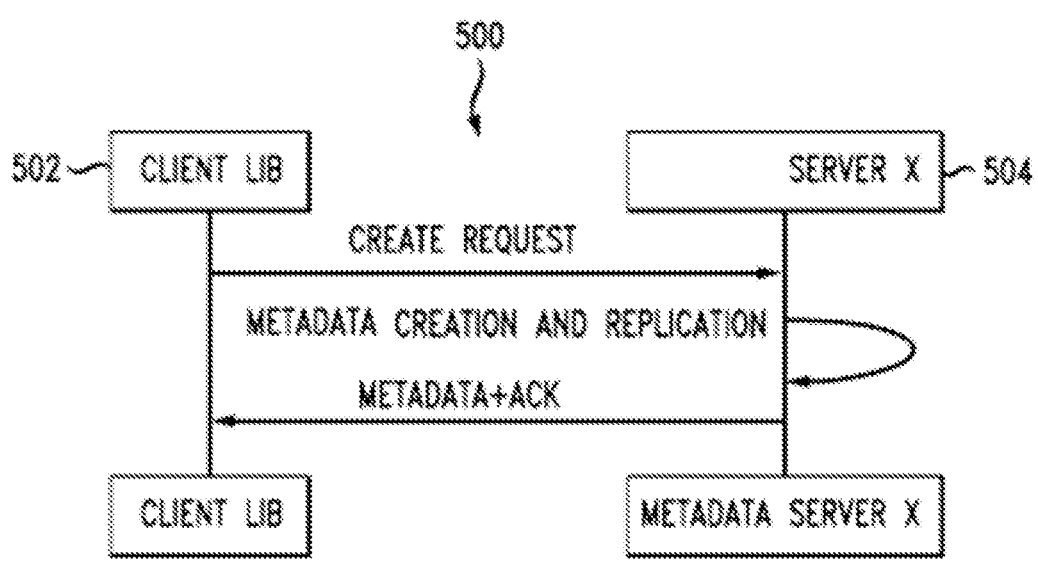
FIG. 5 illustrates signal processing for a create request.

Next, example operations of the distributed storage system are described. First, the process of creating an object is described with reference to FIG. 5. FIG. 5 illustrates a system 500 used to create an object. To create the object, the client library 502 computes a family of pseudorandom seeded X-bit hashes based on the object name and consecutive integers as seeds. In one example, X is less than 128 and depends on the length of the metadata system IPv6 prefix 204. The size of the family is the metadata replication factor and is configurable in the library or from another entity. A high replication factor increases the safety of metadata at the cost of a higher storage overhead for metadata and increases latency in the event where all metadata needs to be updated. High replication also increases the load balancing capabilities for metadata access, which is useful for objects accessed concurrently by a high number of clients.

A first metadata server 504 is in charge of creating the metadata. What the metadata contains can be variable and customized. It is possible that the client 502 creating an object must provide some information to the first metadata server 504 for it to construct the metadata. Several pieces of information can be contained within the metadata. The metadata can include the address of all metadata replicas, in the general case they should just be consecutive hashes of the object name. However, the metadata server 504 could refuse to hold some metadata for several reasons, such as a server could be down, could be full, and so forth. In this case, the next pseudorandom seeded hash would be used as a destination.

The metadata servers 504 holding the replicas should actually notify the former replica holders to complete their metadata. The metadata can also include the address of all object replicas and possibly their state, such as whether they are stale or up-to-date. There are two phases for this process. At the object creation, the first metadata replica holder places all object replicas, according to a given policy. The policy can be determined partly by the storage system itself and partly by the client, and this is a customizable process. When the client first receives metadata, the addresses for the object replicas are generic addresses for the storage node that they should be stored on. For example, the first or last address of the prefix of the storage nodes can be assigned. Later, storage nodes assign a unique IPv6 address to every replica and metadata is updated. The metadata can also include the object name, so that hash collisions can be dealt with. These are improbable but still could happen.

The metadata server 504 also represents replica metadata servers. Multiple metadata servers can be utilized for redundancy and load-balancing. A client may submit a metadata request based on their computation of the metadata hash. If that server is down or overloaded, the client can compute another metadata hash and access replica metadata at a different server.

Any other information relevant to the metadata level for the storage system, such as access control lists (ACLs), total duration of the object in a video chunk, and so forth, can also be contained within the metadata. What the metadata contains is highly customizable. However, it should be remembered that at any time, one of the metadata fields can change, and all metadata replicas have to be updated. For example, for a regular file, every write on the file increments the file size. As such, in one aspect, the system does not store the size of the file in the metadata but rather at the beginning of the object containing the text file itself. Utilizing the various information that the metadata should contain can mean that the metadata creation process is dependent upon the desired policy, both for resiliency and consistency.

As shown in FIG. 5, one example approach is that the client 502 sends a create request to a metadata server 504. The metadata server creates the metadata and replication data and returns the metadata and an acknowledgment to the client 502. In one aspect, the request may include some user designated requirements such as a quality of service, a type of storage hardware, a geographic location, accessibility parameters, and so forth. Thus, if the request is an initial request to write an object to a storage node, particular requirements for that process can be articulated. Matching a request for certain parameters with the actual process of writing or reading data can be accomplished in a number of different ways. One example approach could be performed at the first time when the system receives the metadata prefix. When a user or an administrator requests a certain parameter, the metadata server 504 can essentially match that request with storage nodes implementing policies or qualities of service that match the required parameter. Thus, a certain storage node or group of storage nodes may implement policies (certain QOS, hardware type, etc.) that match the requirement in the request and the metadata created by the metadata server will direct the client to those storage nodes.

In an alternate approach, a hybrid storage servers pool can be established in which the client asks for a QOS (or some other parameter) in the create request. In this scenario, the metadata server holding the first metadata replica could provision or establish the storage of the object by selecting the storage nodes fulfilling the requested QoS and implement the required parameters for the object and its replicas, if any.

Figure 6:
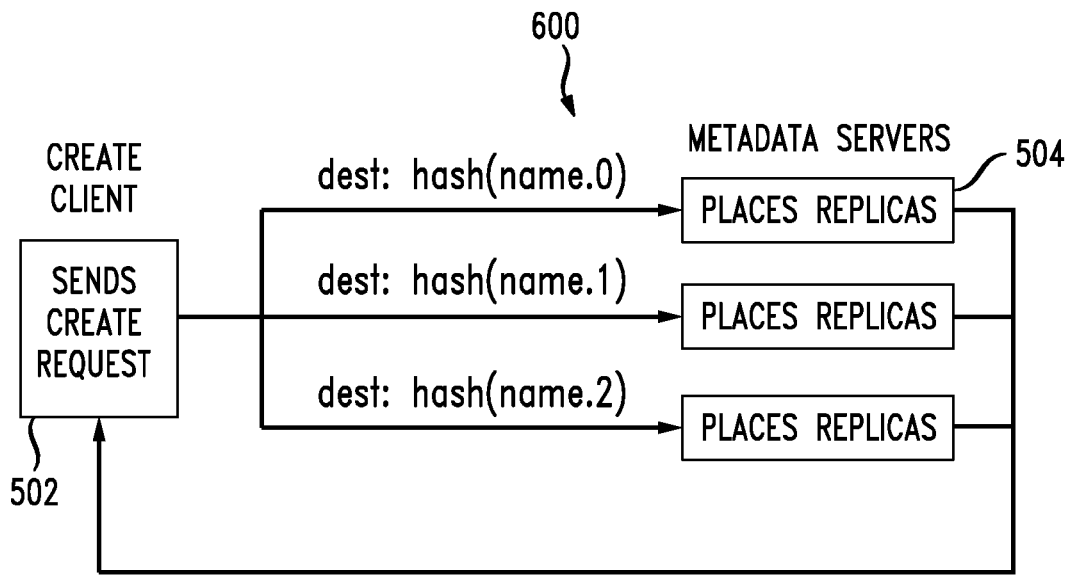
FIG. 6 illustrates further the process of placing replicas in connection with the create request.

FIG. 6 illustrates another aspect of this feature with the graphic 600. The client 502 sends the create metadata request. Three different pathways are described which identify a destination through the use of a hash such as dest: hash(name,0), dest: hash(name, 1) and dest: hash(name, 2). The metadata server 504 places replicas of the data in various storage locations. The metadata from the various metadata servers is returned to the client 502.

Figure 7:
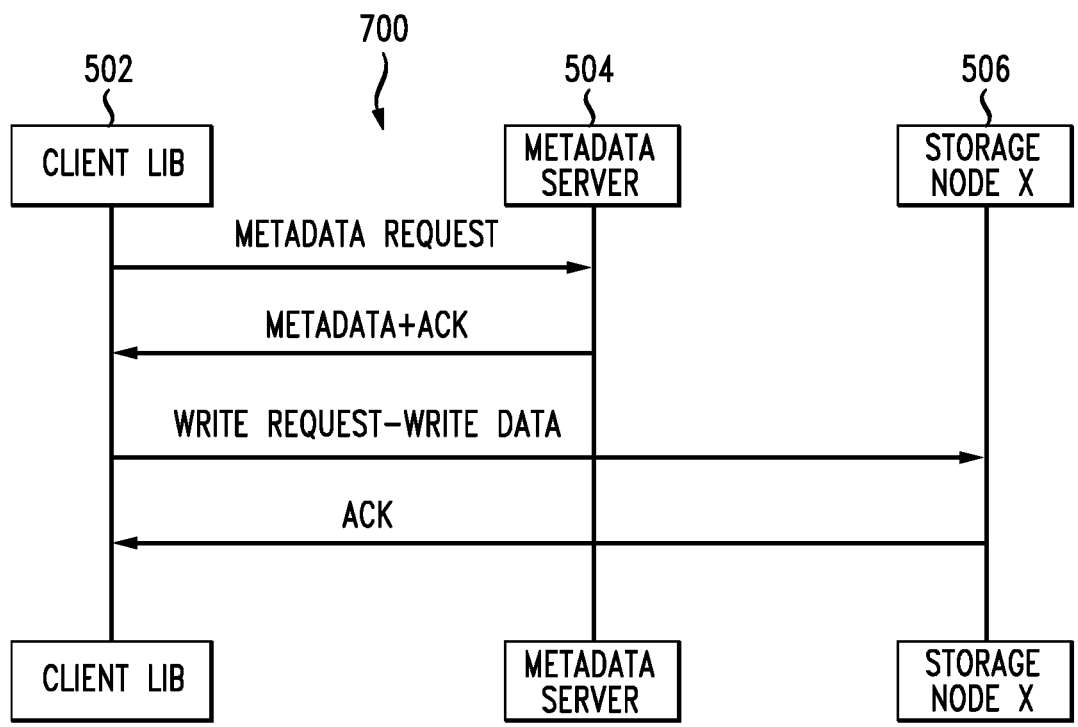
FIG. 7 illustrates the signal processing and a write request.

FIG. 7 illustrates a write operation 700. To write an object, the client library first fetches the object metadata through metadata request to the metadata server 504. To retrieve the metadata, the client computes the X-bit hashes previously mentioned, which gives the IPv6 address of the metadata. For metadata load balancing, the client 502 can compute any of the X-bit hashes of the previous hash family. With the metadata, the client 502 sends a write request with the data to the dedicated storage nodes 506. This can be done in parallel for the client 502 to ensure that data has been written on all storage nodes. It can also be done in sequence so that the client 502 only waits for a number of storage nodes to acknowledge thus reducing latency, at the cost of a slightly higher probability of failure.

An example policy is a classical quorum policy. For a X:Y quorum policy (typical values are 2:3 or 3:5 depending on the resiliency policy), the client 502 writes data on the primary replica. This primary replica then updates the other replicas. The client receives an acknowledgment only when X out of the Y replicas have been written, so that the main replica receives the acknowledgment for at least one of the replicas for a 2:3 policy. This is also influenced by the expected consistency policy, which is: the smaller the ratio of a quorum policy, the fastest the client gets an acknowledgment, so the smallest the latency is, but the highest chance of having inconsistent replicas exists. This can be a problem if the application is reading a replica that hasn't been updated of the just-modified object after having received an acknowledgment for this update. In one example, if the administrator wants high reliability, the system can establish five replicas of an object. The purpose for such a high number of replicas can be for security, load-balancing, and so forth. When the system is storing the five replicas, one may not want to wait until all five replicas are completely stored before sending an acknowledgment. A policy could be established in which the storage nodes are to send an acknowledgment after storing three of the five copies. Then, to ensure that the five replicas are successfully stored, the policy could include, if there are errors in storing the fourth or fifth copies, that repairs can be made from one of the successfully stored first three copies. This provides one nonlimiting example of got the kind of flexibility that can be available in the storage system used utilizing the IPV6-based approach disclosed herein. Because of this flexibility, users can more easily manage the storage of their data. For example, large video files can be stored for further processing or chunked into multiple smaller pieces and because of the manner in which the storage of data is managed as disclosed herein, any approach which is desired can be easily managed using the IPv6 based storage management system. A policy could be established to store one main copy of an object on the SSD and backup copies on a hard drive.

Figure 8:
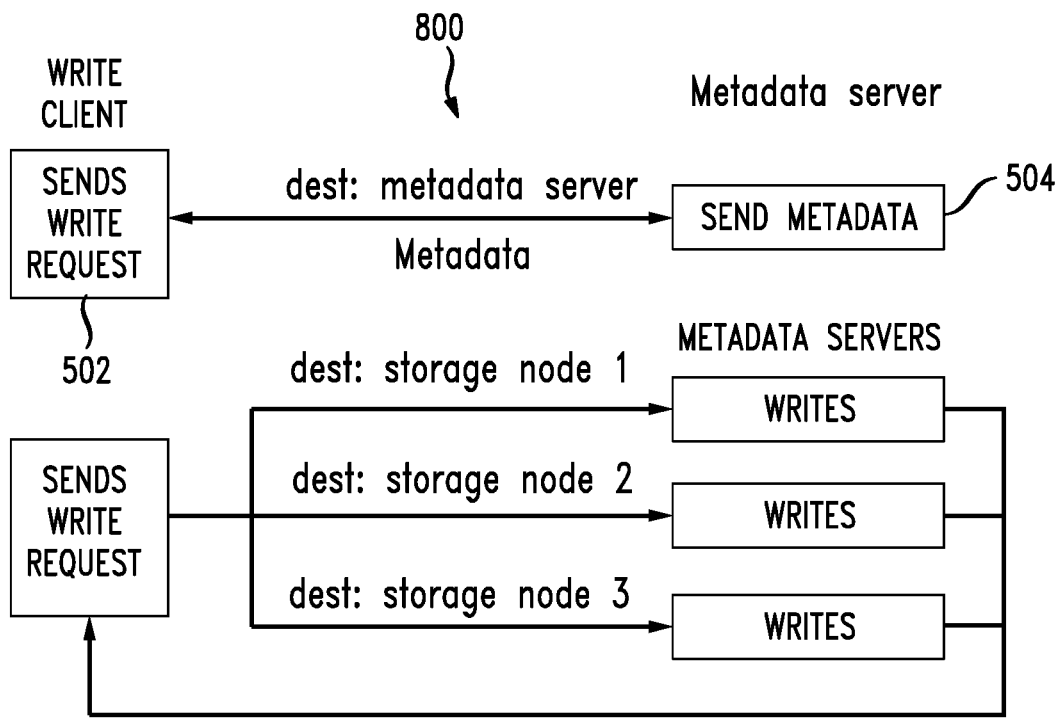
FIG. 8 illustrates further processing in connection with the write request.

FIG. 8 illustrates another aspect of the write concept. The client 502 sends a metadata request to the metadata server 504. The metadata server 504 returns the metadata to the client 502. The client 502 sends a write request utilizing the metadata, with the data. The example format is dest: storage node 1, dest: storage node 2, etc. The process includes writing the data to the destination node and returning an acknowledgment to the client 502.

Figure 9:
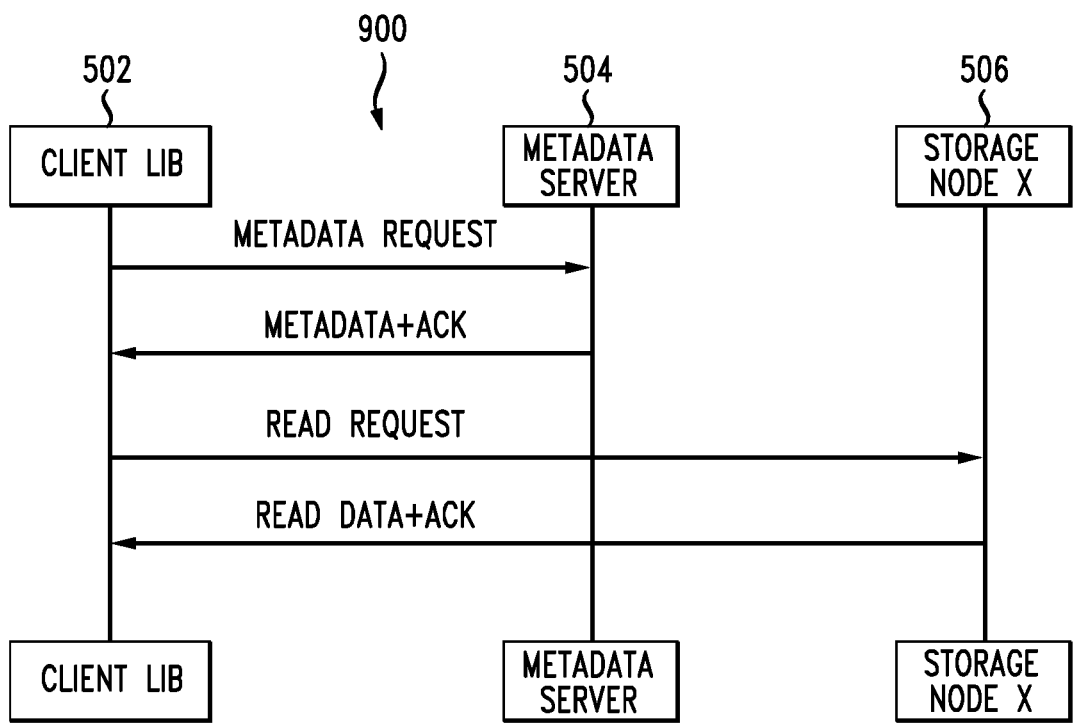
FIG. 9 illustrates processing in a read request.

FIG. 9 illustrates an example structure 900 for a read process. To read an object, the client retrieves metadata the same way as for a write request. The client 502 sends a read request to one of the storage nodes based on the received metadata from the metadata server 504. The read request is typically the most frequently used request. There may be an opportunity to load balance, either by having the client 502 selecting a random storage node between the storage nodes that contain the object or on the metadata server side by sending only partial metadata containing a subset of the list of storage nodes holding the object. In some cases, the client 502 can store the metadata for an object. If the client recently retrieve the audit object from storage and has a metadata in its cache, the client could simply submit a read request again to the storage node 506 without requesting the metadata from the metadata server 504.

Figure 10:
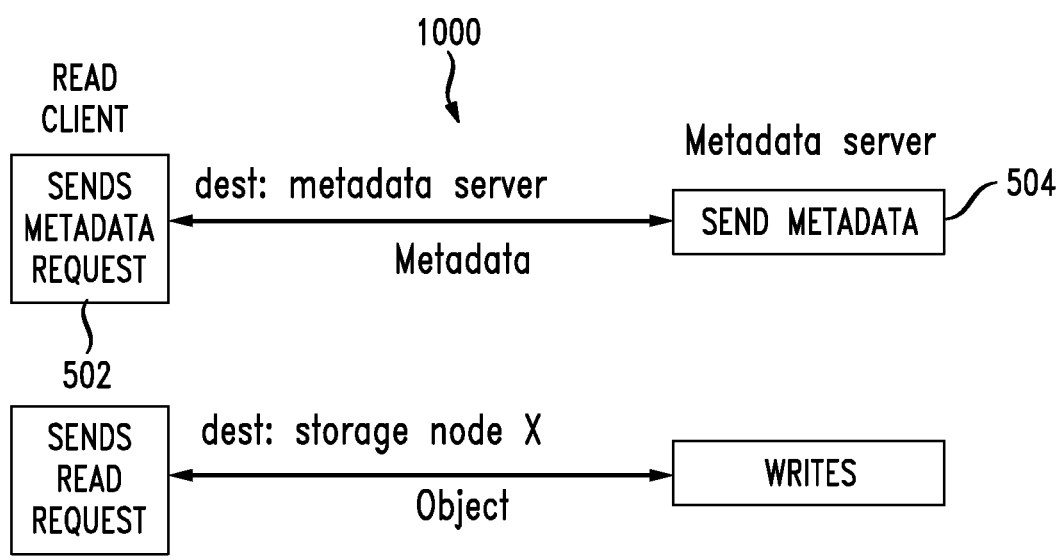
FIG. 10 illustrates further processing in connection with a read request.

FIG. 10 illustrates the client 502 sending the metadata request to the metadata server 504 that returns the metadata or, as noted above, partial metadata containing a subset of the list of storage nodes that hold a particular object. Utilizing the metadata, the client 502 sends a read request to the storage node X, or multiple storage nodes, which return the object to the client.

Note that all these operations are transparent to the user application. A client library provides a regular object storage interface to applications using it. This library is configurable to allow for different policies regarding data safety, data and metadata placement, and so forth. The backend storage requires no configuration or change for it to provide different policies on this matter, which greatly simplifies the administration.

Figure 11:
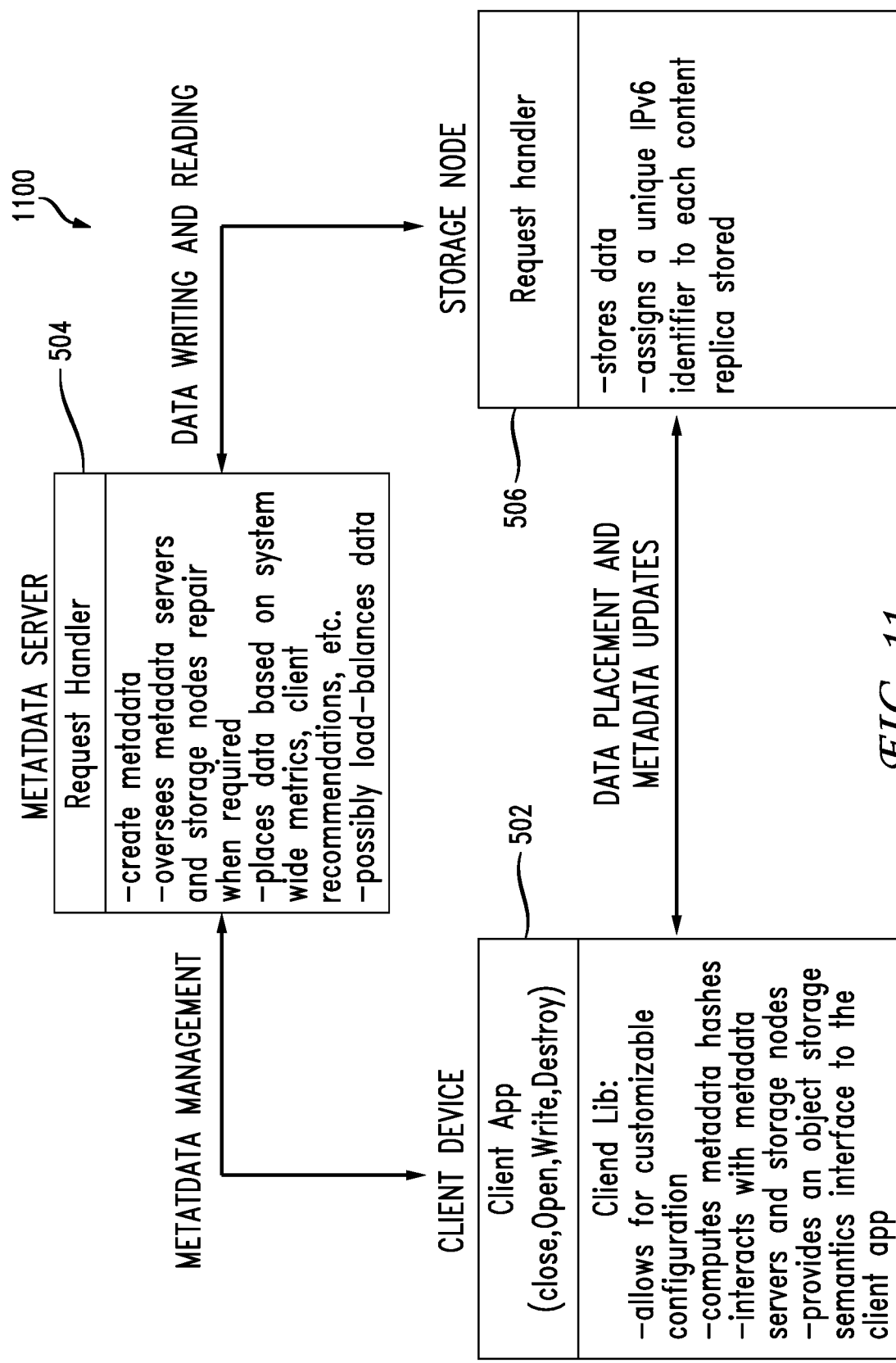
FIG. 11 illustrates the logical view of the response ability of every actor in the storage system.

FIG. 11 illustrates an overall system 1100 which includes a logical view of the responsibilities of the various actors in the storage program. The client device 502 initiates the request to perform such functions as close, open, write, read, destroy. The client library associated with the client device 502 allows for customizable configuration, computes metadata hashes, interacts with metadata servers and storage nodes, and provides an object storage semantic interface to the client application. The metadata management occurs between the client device 502 and the metadata server 504. The metadata server 504 can be considered a request handler and creates the metadata, oversees the metadata servers and storage nodes repair when required, places data based on systemwide metrics and possibly client recommendations, and can perform load-balancing of data requests and access. The data placement and metadata update occurs between the metadata servers 504 and the storage nodes 506.

The storage node 506 represents request handlers that store the data, and assigns a unique IPv6 identifier to each content replica stored. The data writing and reading occurs between the client device 502 and the storage node 0506.

One example of the system disclosed in FIG. 11 is as follows. A system can include at least one storage node and at least one metadata server, wherein the system is configured to communicate with a client device and the at least one storage node for managing a storing of objects. The at least one metadata server can be configured to receive a request to create metadata associated with an object to be stored, wherein the request comprises a computed metadata hash that is computed at the client device, create the metadata in response to the request and place the object for storage at the storage node based on at least one of system-wide metrics or a client recommendation. Other factors can be used as well for making storage placement decisions. Such can include, but are not limited to, one or more of quality of service requirements, access control lists, load-balancing, premium pricing, user priority, user profile data, data regarding performance of the storage system, and so forth. The at least one storage node can be configured to receive and store the object and assign a unique IPv6 identifier to each replica of the object.

Other characteristics of the storage system include the following features. The system is flexible. Different IPv6 prefixes can be assigned for different types of storage, such as flash, hard drive, and so forth. This effectively makes the nature of the performance of storage almost transparent to the system by just addressing different stores types by selecting different addresses. In a cloud scenario where there are multiple tenants, a metadata prefix can be assigned to each tenant, so that isolation is insured and no collision happens between different users. Through the use of different prefixes, the system can also support different policies for replication, repair, load-balancing, data placement, ready partition of contents, and so forth. The used hashing function can vary to fit the properties that one request for a specific application. For example, a hashing function can be designed to yield close hashes for objects with similar names or oppositely to have a cascade effect, which means that two names with only a bit different can give completely different hashes. In another aspect, the flexibility of the system is provided by the metadata being customized. The metadata can contain enough information to locate the contents, but could also contain many other parameters or types of information, such as access control lists, size, duration a video chunk, or any other type of object metadata.

The system disclosed herein is also not heavily layered. For example, the IPv6-centric design allows for the client to directly connect to the metadata servers and the storage nodes without the need for inter-node communication and a complex metadata maintenance process. The system map is the network itself and does not have to be consistently maintained across all nodes, or shared with clients, and so forth. The client accesses data much like it would do when it uses a simple file system. The client first batches metadata (a functional equivalent of data stored in the filesystem inodes) that give the client information on where the data or the blocks are. In the file system case, the metadata stays totally hidden to the client.

Other benefits of the approach disclosed above include that it does not consume much bandwidth. The approach does not use much bandwidth because the bandwidth is used as almost exclusively dedicated to data transmission between clients and servers and repairs, if need be. The only overhead is the very lightweight request protocol for signaling messages and metadata migration when new servers are added to the metadata server pool. This migration can be caused by the metadata system prefix being static, which means adding or removing metadata servers requires a change in the metadata servers prefix allocation, which in turn leads to a migration to fit the new distribution. This is similar to the Ceph example, only the concept is metadata instead of data. Note that metadata are usually much more lightweight than the content itself, and the metadata can go as small as a few KB for a multi-GB object. This effectively prevents the kind of overhead that other systems suffer when adding a new server.

Another benefit of the approach is that it is easily manageable. Different policies can be defined for multiple aspect of the whole system and each one of them is associated with an IPv6 prefix. For example, one can imagine a system with two prefixes. One prefix would be dedicated to highly requested and often accessed objects, that have a high replication factor. For example, for load-balancing and resiliency sake, such objects could be highly replicated. The objects are stored on expansive flash discs, or on other dedicated storage means compared to regular object with a smaller replication factor and stored on traditional hard disks, corresponding to the other prefix. Another use could be to give a prefix to each data center and to force the system to store replicas of both metadata and data on different prefixes to have the whole data center level of resiliency. A further use case could be to provide different qualities of service to different types of users for a content delivery network (CDN): some premium range of users would have access to some prefix that has a small capacity caches (well distributed) that store a high quality video content, while regular users would only be allowed to access medium quality content stored under another prefix namespace.

In another aspect, accessing the content can be easily monitored by simple traffic inspection. Each IPv6 address corresponds to one content. Thus, obtaining valuable information about the storage system itself is a very simple and effective task. The use of the IPv6 structure (or similar structure) to address content is an effective feature of an example distributed storage system. The fact that a client request can be routed all the way down to the actual object means that there is no need for redundant communication between nodes to know how to reach any specific content. It also means that every existing Layer 3 tool can be used for different purposes. For example, segment routing can benefit the system for load-balancing between paths by just giving a client a segment routing list instead of just an address pointing to the content. Additionally, the system map is fully stored in the network itself, contrary to other storage systems, where different system maps have to be created, maintained, kept consistent between devices, regularly updated, distributed to every client, and so forth. In the system disclosed herein, the client library only has to know IPv6 prefixes corresponding to different policies. This prefix is static, and each element of the underlying architecture is transparently addressed by the network. The addition or the removal of new storage devices only translates in a few route changes in the datacenter routers and a light metadata rebalancing to fit the new architecture, which are operations the clients are oblivious to. Furthermore, aggregating statistics about network flows is easy and can be done in the network layer. For traditional distribution storage systems, the system itself has to support and integrate analytics tools for this purpose that can be complex and require additional resources on each node.

Another benefit of the approach disclosed herein is that it is easy to build upon. The design of the storage system allows for the incorporation of erasure coding techniques, such techniques encode data in several fragments that are distributed amongst different nodes and have a non-integer replication overhead. One can typically achieve the same resiliency in a 1, 4 ratio. For example, 14 encoded shards from data originally striped in 10 fragments present a better resiliency level than 3 stored replicas, provided they are stored on different storage nodes, effectively more than halving the storage overhead. One could incorporate the encoding information in the metadata into the disclosed storage system rather than just a replica's location. This comes, however, with a price in that the encoding utilized will consume computing resources, require complex metadata and add an encoding/decoding latency. Any traditional authentication method can also be implemented so that metadata servers verify the identity of clients before responding to any query.

The system can be an IPv6 centric distributed storage system that builds around the pool of organized metadata servers and a pool of storage nodes. Both pools are flat pools and do not follow a master/slave architecture so that there is no artificial bottleneck or single point of failure. The system can be globally fully distributed and resilient (No SPOF) and can support elaborated load-balancing policies as well as various deployment models. The system's applicability can include, without limitation, from DC Central storage system to a fully distributed storage suitable for IoE applications.

Figure 12:
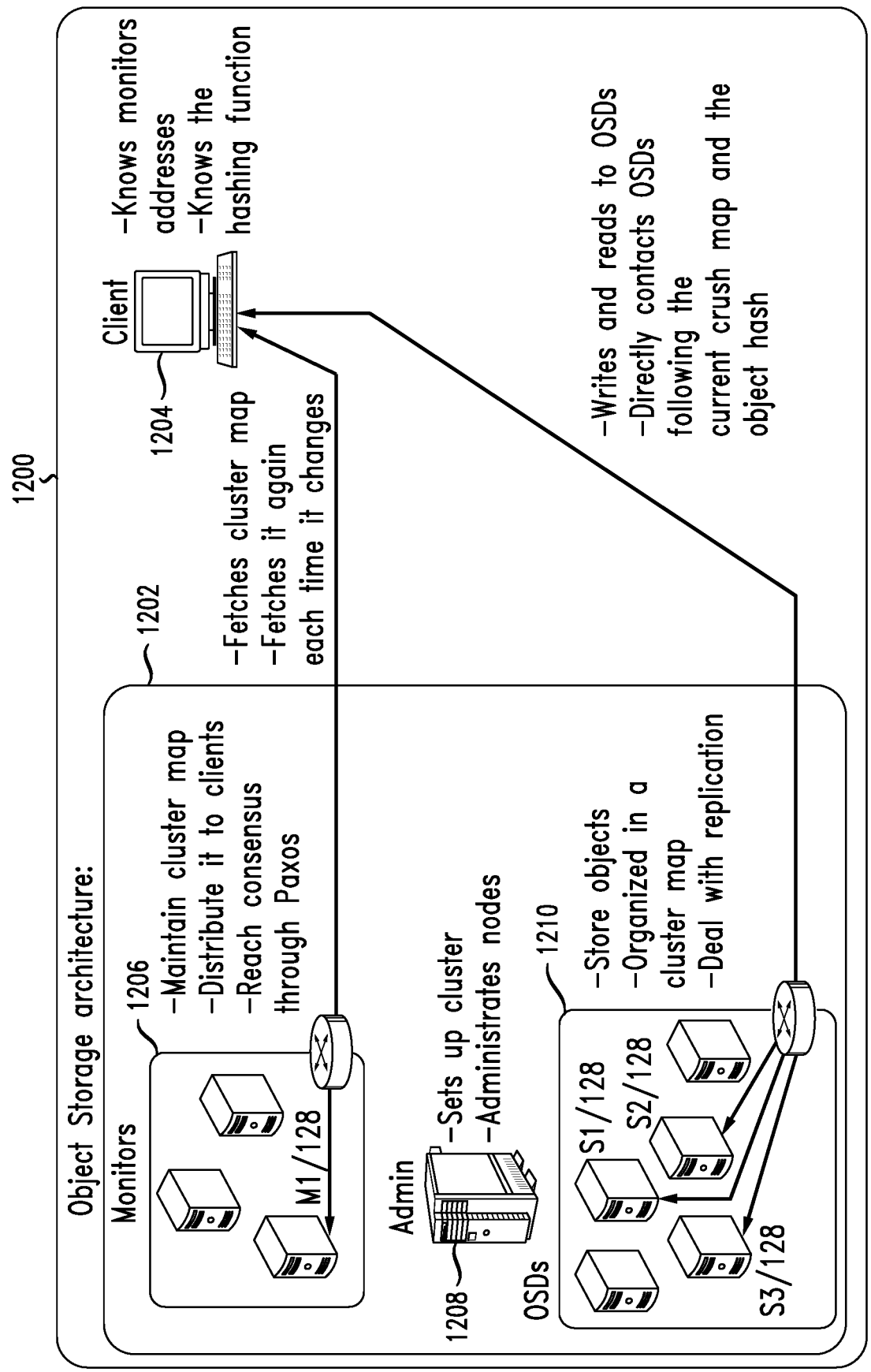
FIG. 12 illustrates an object storage architecture.
Figure 13:
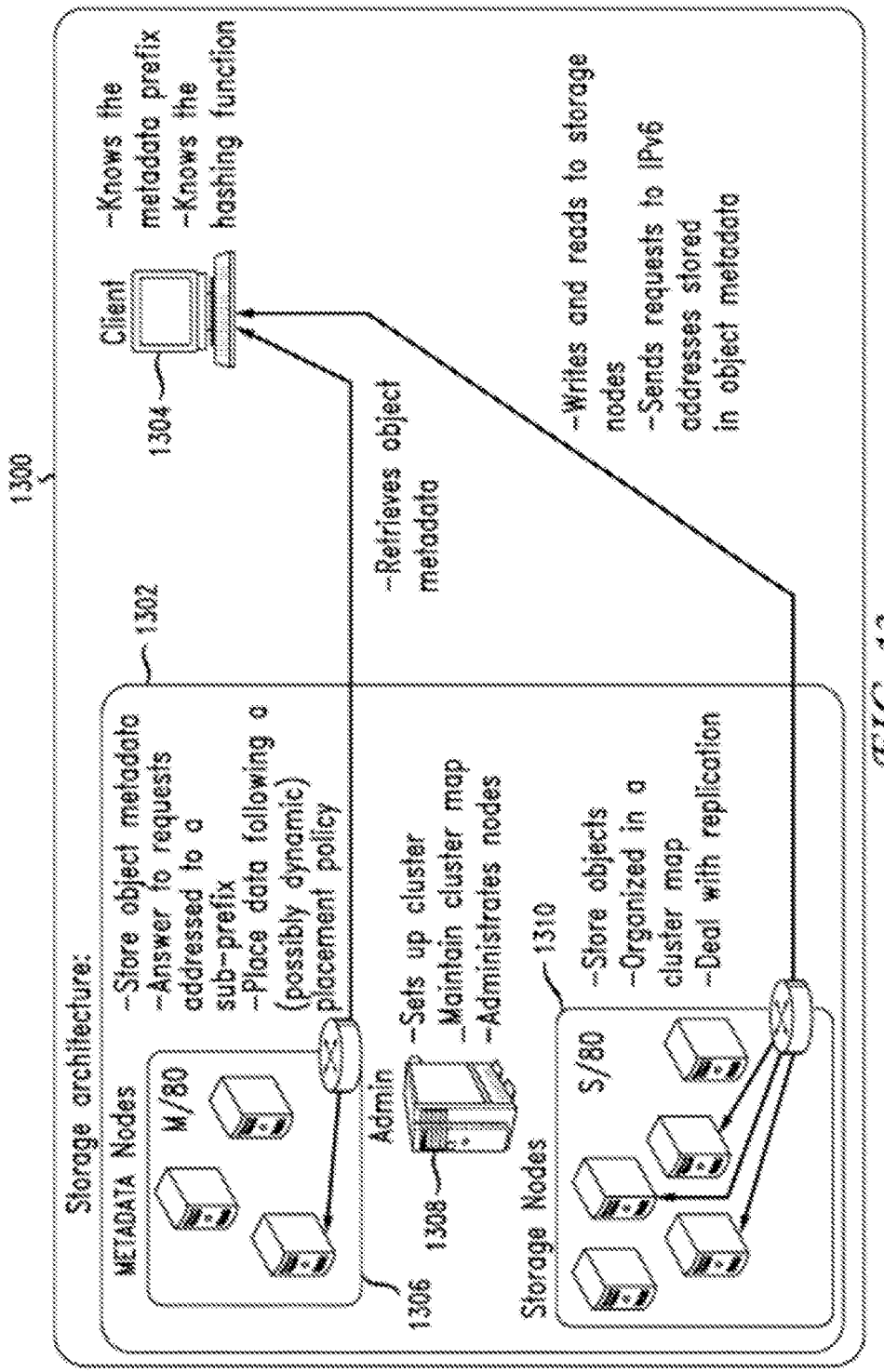
FIG. 13 an aspect of the storage architecture according to this disclosure.

FIG. 12 presents an example object storage architecture 1200 which can be contrasted with the architecture 1300 shown in FIG. 13. Based on its fully distributed architecture 1300, there is no system wide bottleneck, especially during metadata access (contrary to 1202 for the map or GFS for the singe master access). The system 1202 includes monitors 1206 that maintain the cluster map, distribute the cluster map to clients, reach consensus through Paxos and send a fetched cluster map to the client 1204 each time it changes. In system 1202, a map has to identify every node and the monitors have to have knowledge of every node in the system. The more nodes in the system, the more complex the map becomes. In the system 1202, the client 1204 knows the monitors addresses and knows the hashing function. The client 1204 writes and reads to the database 1210 and directly contacts the object storage devices (OSDs) following the current cluster map and the object hash. The OSDs 1210 store the objects, are organized in a cluster map, and deal with the replication issue. An administrator 1208 sets up the cluster and administrates the nodes.

FIG. 13 illustrates another aspect of the present disclosure. The general concept is to move everything regarding managing the storage of data into the network. Every part of the architecture 1300 can be upscaled by adding more dedicated servers 1310 without impacting the rest of the system. The storage nodes 1310 store the objects, are organized in a cluster map, and deal with replication. The client 1304 retrieves object metadata from the metadata nodes 1306, which store the object metadata and answer the requests addressed to a sub-prefix, and place data following a placement policy which can be dynamic. The client 1304 knows the metadata prefix and the hashing function. The client only needs to know the single metadata prefix to address the whole storage domain which simplifies the amount of data the client needs. The client 1304 writes and reads to the storage nodes 1310 and sends requests to IPv6 addresses stored in object metadata. An administrator 1308 sets up the cluster, maintains a cluster map, and administrates the notes.

A difference between existing storage systems. Everything is identified through the IPv6 protocols or headers. This means that the data is accessible through the network. The client only needs to know the IPv6 prefix of the storage domain that the client links to. This simplifies the most—the client does not have to know what is behind the prefix. It could be one node or 100 nodes. The simplicity is achieved by using the pseudorandom function which hashes the object name and outputs an IPv6 address which has a prefix. When the client desires to write or receive an object, it only has to hash the object name which will give a metadata address, which address will be inside the metadata system prefix. The client will send the request to the address, which address will correspond to a sub-prefix that is held by a metadata server. In FIG. 13, the "M/80" prefix would be split into three as there are three nodes shown (by way of example). Every node will have contiguous prefixes. If you add a new metadata node, to increase the size of the system, you just split the prefix again, and give a part of the prefix to a new metadata node, which will not change the prefix. The metadata system prefix is fixed. The metadata is very light, which is a small amount of information. The metadata might be the size or the type of object. Thus, in FIG. 13, the prefix (M/80) is fixed and the information is simple, rather than a complex cluster map that has to be updated. Additionally, in FIG. 12, the system hashes the object name to find where you store the object. In FIG. 13, you has the object name to find where you store the metadata. In FIG. 13 you balance light metadata when a metadata server is added or removed, whereas the system in FIG. 12, the system balances the objects when a new OSD is added or removed.

Only metadata are redstributed when a new metadata node is added or removed (unlike system 1202), which keeps the network usage overhead almost minimal during maintenance operations in the datacenter. The number of software layers is kept minimal (unlike other distributed storage systems). This means that computing resources are kept minimal. The voluntarily clean and simple design of the system, as well as its complexity with the network means that there is no need to maintain different maps, distribute them amongst nodes and keep them consistent. The simplicity of the present system also allows for a highly flexible storage system that permits the administrator 1308 to very easily and transparently define totally different policies for different parts of the storage system. The IPv6-centric design of this system, in addition to allowing for the simplicity and flexibility that is already pointed out, makes the administration and analysis of the storage system very easy through the use of unique IPv6 addresses for content. All of these characteristics drastically improve read/write performance and allow for high throughput, easy management and simple analytics gathering.

The system disclosed herein can be independent from the entities using it (the client) and aims at storing very generic data that can range from very small to very large data. It is not simply a mesh network of storage nodes. Furthermore, the disclosure proposes not only to identify data by their IPv6 identifies, but also to classify storage classes by IPv6 prefixes, meaning that instead of combining just identification and location, the disclosure combines identification, location and QoS required for the data. This is an important step in facilitating the maintenance and the organization of a generic distributed storage system, e.g. a data center.

Storing replicas on highly different locations ensures that a localized power failure or accident won't bring down all the available replicas. This is why the ability to define several metadata prefixes can be used to define different failure domains. The approaches disclosed herein can shift the complexity of maintaining a cluster map that has to be distributed to clients and kept self-coherent to the network. In some cases, only the orchestrator (that clients do not access) has to maintain a structure that allocates IPv6 prefixes to metadata nodes. Other than that, clients may only require limited, static information bits, like the system metadata IPv6 prefix or other configuration details, which typically may not change over time. Additionally, this information may not be 'consciously' owned or managed by the client since it may be a client library configuration parameter. The capacity to scale the metadata side of the storage system is advantageous because it allows much more flexibility in the storage system designs as well as for operating the system. It can almost indefinitely grow whereas other systems which have a single master node will always in the end be bounded by the capacity of the master node to deal with all incoming requests.

In some cases, the storage for metadata as well as actual client data can be scaled independently, to allow for widely different scenarios (few big objects, small metadata and few metadata servers; numerous small objects, comparable size metadata, and numerous metadata servers). With large amounts of data in the storage system, under the approach in FIG. 12, when one adds new nodes to the storage system, terabytes of data may need to be moved, which is very cumbersome. Thus, scaling and redistribution of data becomes problematic. Using IPv6 is used to provide more finely tuned data for the system. Different policies could be applied to different prefixes. An orchestrator can manage those policies for particular prefixes. Thus, a certain quality of service, or certain hardware profile, or geographic location, could be associated with a certain prefix or sub prefix. Thus, when a client seeks the object metadata for accessing the object or writing the object, the orchestrator can apply the policy for that zone or that prefix. The whole storage system is managed by using different IPv6 prefixes and thus all of the complexity is within the network.

In one example, geographic control or policies can be implemented. For example, if an administrator wants storage nodes to be established across a particular geographic location, such as California and Alaska, the system can assign an IPv6 prefix or prefixes to storage nodes in those geographic locations. Once the assignments are made, policies can be established to route or distribute objects to be stored on those particular nodes in those geographic locations. Thus, through the assignment of addresses or IPv6 prefixes, one can manage the geographic topology of a network in an efficient manner. Another advantage is that identifying storage locations with IPv6 prefixes can also simplify the view of the network in that even if data is moved from one physical storage node to another, the logical view of the stored objects can remain the same. The physical location of the data does not matter.

Figure 14:
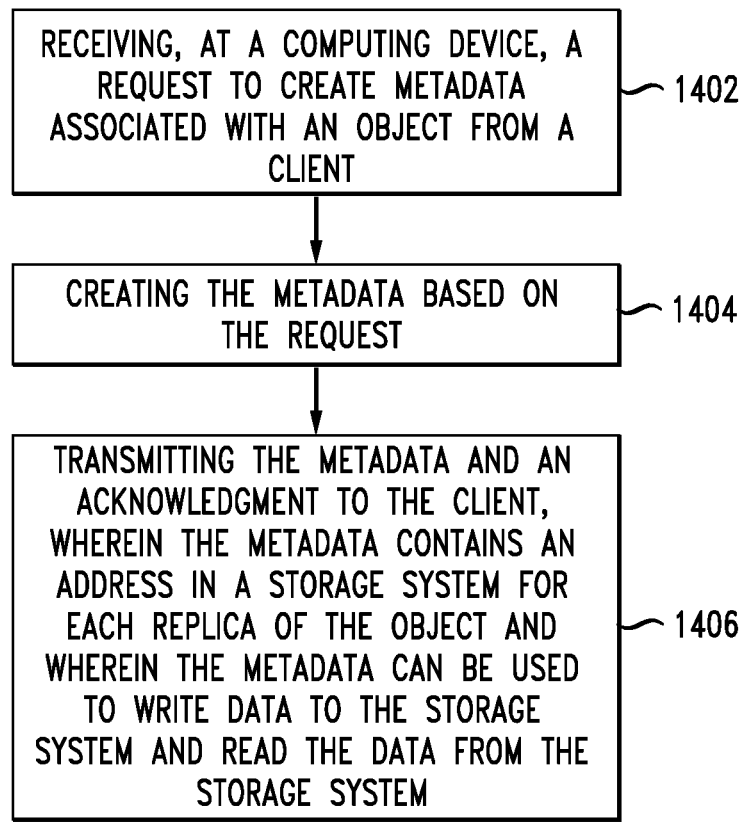
FIG. 14 illustrates a method example.

FIG. 14 illustrates a method embodiment. The method embodiment includes receiving, at a computing device, a request from a client to create metadata associated with an object (1402), creating the metadata based on the request (1404) and transmitting the metadata and an acknowledgment to the client. The metadata can contain an address in a storage system for each replica of the object and can be used to write data to the storage system and read the data from the storage system (1406). The system can open up a connection between the client 502 and the metadata server 504 according to the address. If the node 504 is down, there are metadata replicas (for replication as well as load balancing), so the client can make another request by computing another metadata hash. With the created metadata from the metadata server, a connection can be established between the client 502 and the storage node 506 for writing or retrieving data. The storage node 506 will, in a write scenario, assign a unique IPv6 identifier to each version of the object stored. If the operation is a read operation, the storage node 506 will provide the data to the client device 502.

No filesystem layer is required between the application layer and the storage system. The storage system contains the pool of metadata servers and the pool of stored servers. Writing and reading the data from the storage system can be accomplished via an IPv6 address stored in the metadata. IPv6 prefixes can be used to represent a group of addresses or can be used to provide tailored writing or reading to or from the storage system according to a policy. In another aspect, a metadata prefix can be assigned to each tenant in a multi-tenant environment. The client can compute a family of pseudorandom seeded hashes based on an object name or consecutive integers as seeds. The client can also compute a family of pseudorandom seeded X-bit hashes based on an object name, wherein X is less than or equal to 128. In another aspect, the metadata, when used to write the data to the storage system, is utilized to write replica data to the storage system. For example, the metadata can include information for writing replica data, including identification information for the replicate data and storage system.

The method can further include, by the computing device, determining where to store the data on the storage system based on a placement policy, system-wide metrics, client recommendations, and/or quality of service requirements. Other factors can also be considered for determining where to store data, such as state information, conditions, statistics, preferences, data characteristics, etc. The method can also assign an IPv6 address to the data, which can identify the data and the location of the data. As previously explained, the method can also use prefixes, such as IPv6 prefixes for storing, maintaining, identifying, and/or classifying metadata, metadata servers, data storage nodes, objects, data characteristics, data requirements, tenants, etc.

The distributed storage system above can be described as a native object storage system which behaves as a block storage system when the objects all have the same size.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   receiving, at a computing device, a request to create metadata associated with an object from a client;
   creating the metadata based on the request; and
   transmitting the metadata and an acknowledgment to the client;
   wherein the metadata contains an address in a storage system for each replica of the object and wherein the metadata can be used to write data to the storage system and read the data from the storage system;
wherein the metadata comprises an IPv6 prefix for a group of IPv6 addresses which are assigned to a the replicas and the object.

2. The method of claim 1, wherein writing and reading the data from the storage system is accomplished via an IPv6 address stored in the metadata.

3. The method of claim 1, wherein the client computes a family of pseudorandom seeded hashes based on at least one of an object name and consecutive integers as seeds.

4. The method of claim 1, wherein the client computes a family of pseudorandom seeded X-bit hashes based on an object name, wherein X is less than or equal to 128.

5. The method of claim 1, wherein the metadata, when used to write the data to the storage system, is utilized to write replica data to the storage system.

6. The method of claim 1, further comprising, by the computing device, determining where to store the data on the storage system based on one or more of a placement policy, system-wide metrics, a client recommendation, and quality of service requirements.

7. The method of claim 1, wherein a metadata prefix is assigned to each tenant in a multi-tenant environment.

8. The method of claim 1, wherein no filesystem layer exists between an application layer and a storage system layer.

9. A non-transitory computer-readable storage device storing instructions which, when executed by at least one processor, cause the at least one processor to perform operations comprising:
establishing a static rule to distribute a first flow to a first server and a second flow to a second server;
receiving a request to create metadata associated with an object from a client;
creating the metadata based on the request, wherein the metadata comprises an address for each replica of the object; and
transmitting the metadata and an acknowledgment to the client, wherein the metadata contains the address in a storage system for each replica of the object and wherein the metadata can be used to write data to the storage system and read the data from the storage system;
wherein the metadata comprises an IPv6 prefix for a group of IPv6 addresses which are assigned to a the replicas and the object.

10. The non-transitory computer-readable storage device of claim 9, wherein the address is an Ipv6 address, and wherein writing and reading the data from the storage system is accomplished via the Ipv6 address stored in the metadata.

11. The non-transitory computer-readable storage device of claim 9, wherein the client computes a family of pseudorandom seeded hashes based on at least one of an object name and consecutive integers as seeds.

12. The non-transitory computer-readable storage device of claim 9, wherein the client computes a family of pseudorandom seeded X-bit hashes based on an object name, wherein X is less than or equal to 128.

13. The non-transitory computer-readable storage device of claim 9, wherein the non-transitory computer-readable storage device stores further instructions which, when executed by the at least one processor, cause the at least one processor to perform further operations comprising:
determining where to store the data on the storage system based on one or more of a placement policy, system-wide metrics, a client recommendation, and quality of service requirements.

14. A system comprising:
at least one non-transitory computer readable medium storing instructions:
at least one processor programmed to cooperate with the instructions to perform operations comprising:
receiving, at a computing device, a request to create metadata associated with an object from a client;
creating the metadata based on the request; and
transmitting the metadata and an acknowledgment to the client;
wherein the metadata contains an address in a storage system for each replica of the object and wherein the metadata can be used to write data to the storage system and read the data from the storage system;
wherein the metadata comprises an Ipv6 prefix for a group of Ipv6 addresses which are assigned to a the replicas and the object.

15. The system of claim 14, wherein writing and reading the data from the storage system is accomplished via an Ipv6 address stored in the metadata.

16. The system of claim 14, wherein the client computes a family of pseudorandom seeded hashes based on at least one of an object name and consecutive integers as seeds.

17. The system of claim 14, wherein the client computes a family of pseudorandom seeded X-bit hashes based on an object name, wherein X is less than or equal to 128.

18. The system of claim 14, wherein the metadata, when used to write the data to the storage system, is utilized to write replica data to the storage system.

* * * * *